(12) United States Patent
Cardwell, III et al.

(10) Patent No.: US 12,072,209 B2
(45) Date of Patent: Aug. 27, 2024

(54) SENSOR GUARD

(71) Applicant: AKTIEBOLAGET SKF, Gothenburg (SE)

(72) Inventors: John Elliot Cardwell, III, Harleysville, PA (US); Michael Ingram, McKinney, TX (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 18/102,108

(22) Filed: Jan. 27, 2023

(65) Prior Publication Data

US 2024/0255321 A1    Aug. 1, 2024

(51) Int. Cl.
*G01D 11/24* (2006.01)
*G01D 11/30* (2006.01)

(52) U.S. Cl.
CPC ........... *G01D 11/245* (2013.01); *G01D 11/30* (2013.01)

(58) Field of Classification Search
CPC .............................. G01D 11/245; G01D 11/30
See application file for complete search history.

(56) References Cited

FOREIGN PATENT DOCUMENTS

| CN | 1474130 A | * | 2/2004 |
| CN | 201662182 U | * | 12/2010 |
| KR | 102438793 B1 | * | 9/2022 |

* cited by examiner

*Primary Examiner* — Jamel E Williams
(74) *Attorney, Agent, or Firm* — J-TEK LAW PLLC; Scott T. Wakeman; Mark A. Ussai

(57) ABSTRACT

A guard is for a sensor having an elongated body with a centerline and opposing ends spaced apart along the centerline, one end of the sensor body being mountable on a mounting surface of a machine such that the centerline is perpendicular to the mounting surface. The guard includes a base having a bore with a central axis, the bore being configured to receive at least a portion of the sensor body such that the base is disposed at least partially about the sensor and the central axis is collinear with the centerline. A barrier is coupled with the base and configured to occupy at least an arcuate portion of a cylindrical space about the central axis of the base so as to prevent contact with the sensor body. Preferably, the barrier includes a body formed either as a trapezoidal prism or generally frustoconical.

21 Claims, 16 Drawing Sheets

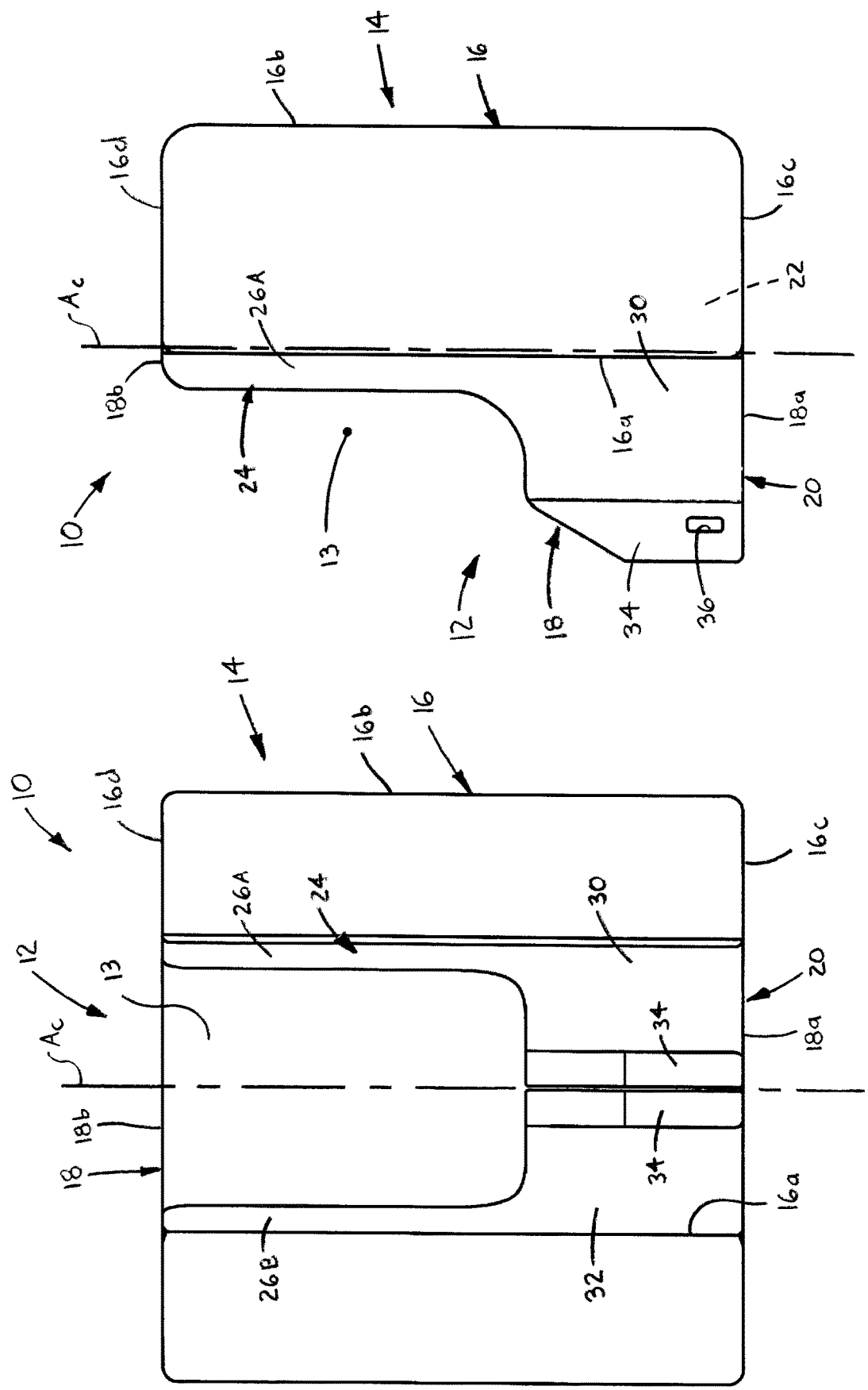

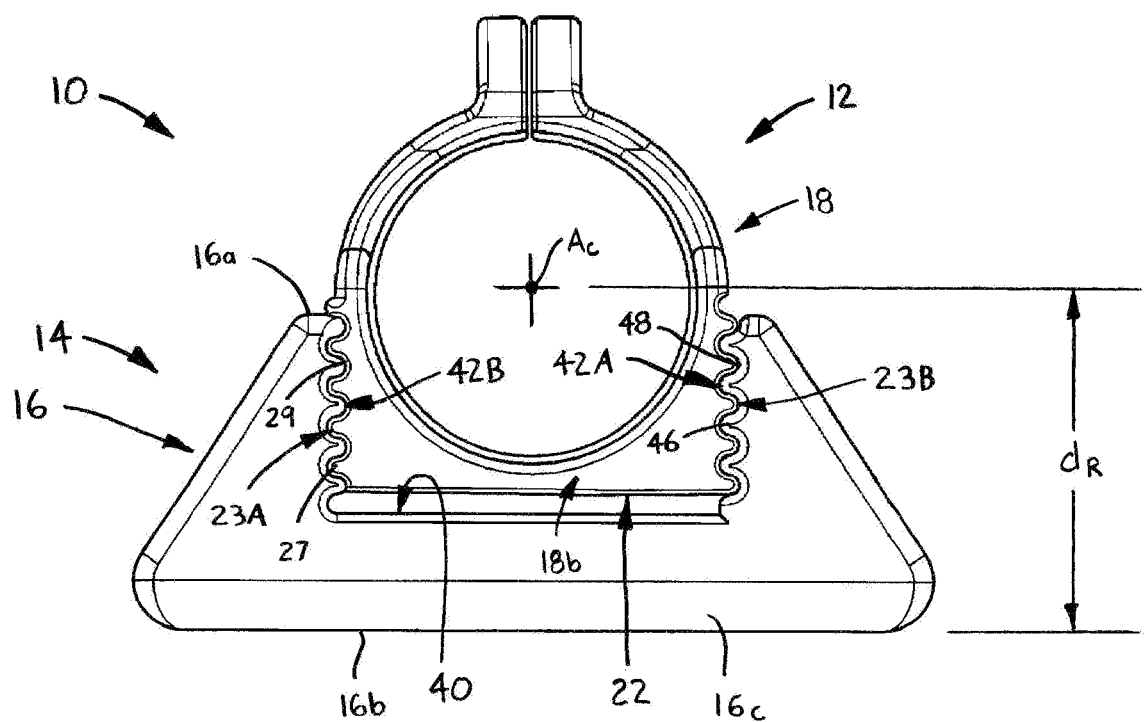
FIG. 13  n=4,5
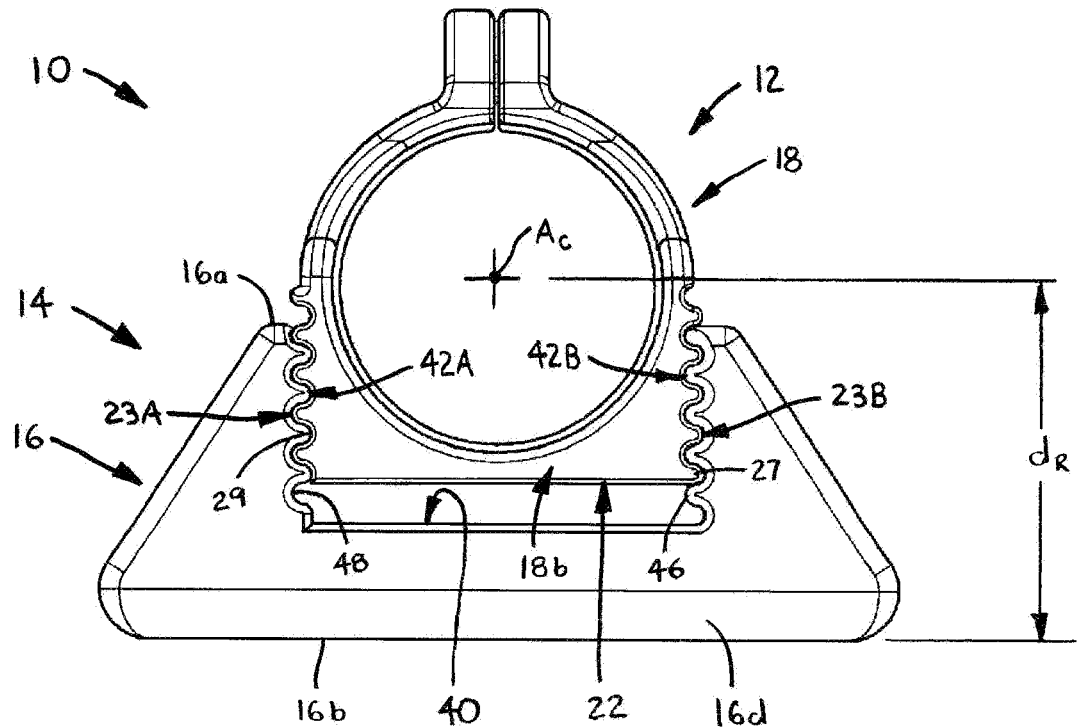
FIG. 14  n=4

SENSOR GUARD

BACKGROUND OF THE INVENTION

The present invention relates to sensors, and more particularly to devices for preventing damage to sensors.

Sensors for machine monitoring are generally known and include devices for detecting machine operating parameters such as vibration, temperature, lubrication levels, etc. One type of sensor for detecting vibration and temperature includes a generally elongated body that is mounted at one axial end to a machine surface, such as provided on a bearing housing, and projects axially outwardly from the surface. Due to the projecting mounting arrangement, this type of sensor is vulnerable to impacts from a machine operator or equipment within a factory containing the machine being monitored. In particular, when the sensor is mounted to machine having an adjacent surface that extends generally perpendicular to or intersecting with the mounting surface, objects such as a machine operator's tools (e.g., a screwdriver, a wrench, etc.), or even an operator's limb, can enter the space between the sensor and the adjacent surface and cause the sensor to be "levered" off of the mounting surface.

SUMMARY OF THE INVENTION

In one aspect, the present invention is a guard for a sensor, the sensor having an elongated body with a centerline and opposing ends spaced apart along the centerline, one end of the sensor body being mountable on a mounting surface of a machine such that the centerline is perpendicular to the mounting surface. The guard comprises a base having a bore with a central axis, the bore being configured to receive at least a portion of the sensor body such that the base is disposed at least partially about the sensor and the central axis is collinear with the centerline. A barrier is coupled with the base and is configured to occupy at least an arcuate portion of a cylindrical space about the central axis of the base so as to prevent contact with the sensor body.

In another aspect, the present invention is again a guard for a sensor as described above and comprising a base having a bore with a central axis and configured to receive at least a portion of the sensor body, such that the base is disposed at least partially about the sensor and the central axis is collinear with the centerline. The base includes a partially annular clamp portion configured to be disposed about the sensor and a generally rectangular connective portion integral with the clamp portion, the bore extending through both the clamp portion and the connective portion. A barrier is coupled with the base and includes a body formed as a generally trapezoidal prism, the barrier body having an inner end, an outer end spaced radially from the inner end by a radial width and a rectangular channel extending inwardly from the inner end and toward the outer end, the base rectangular connective portion being disposed within the barrier rectangular channel to connect the barrier with the base. The radial width of the barrier body has a value of at least half of a perpendicular distance between the centerline of the sensor and another surface of the machine or of another object that is disposed within a plane extending perpendicular to or intersecting with a plane containing the mounting surface.

In a further aspect, the present invention is yet again a guard for a sensor as described above and comprising a base having a bore with a central axis, the bore being configured to receive at least a portion of the sensor body such that the base is disposed at least partially about the sensor and the central axis is collinear with the centerline. A barrier includes a frustoconical body having a radially-larger first axial end disposable against the mounting surface, a radially-smaller second axial end spaced from the mounting surface along the central axis, and a central bore extending between the first and second axial ends, the base being disposed within the central bore of the barrier body to couple the barrier with the base.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 3 is a front plan view of the first construction sensor guard;

FIG. 4 is a front plan view of the first construction sensor guard;

FIG. 13 is a top plan view of the first construction sensor guard, showing a half-step adjustment of the position of the barrier relative to the base;

FIG. 14 is a top plan view of the first construction sensor guard, showing a full step adjustment of the position of the barrier relative to the base;

DETAILED DESCRIPTION OF THE INVENTION

Figure 1:
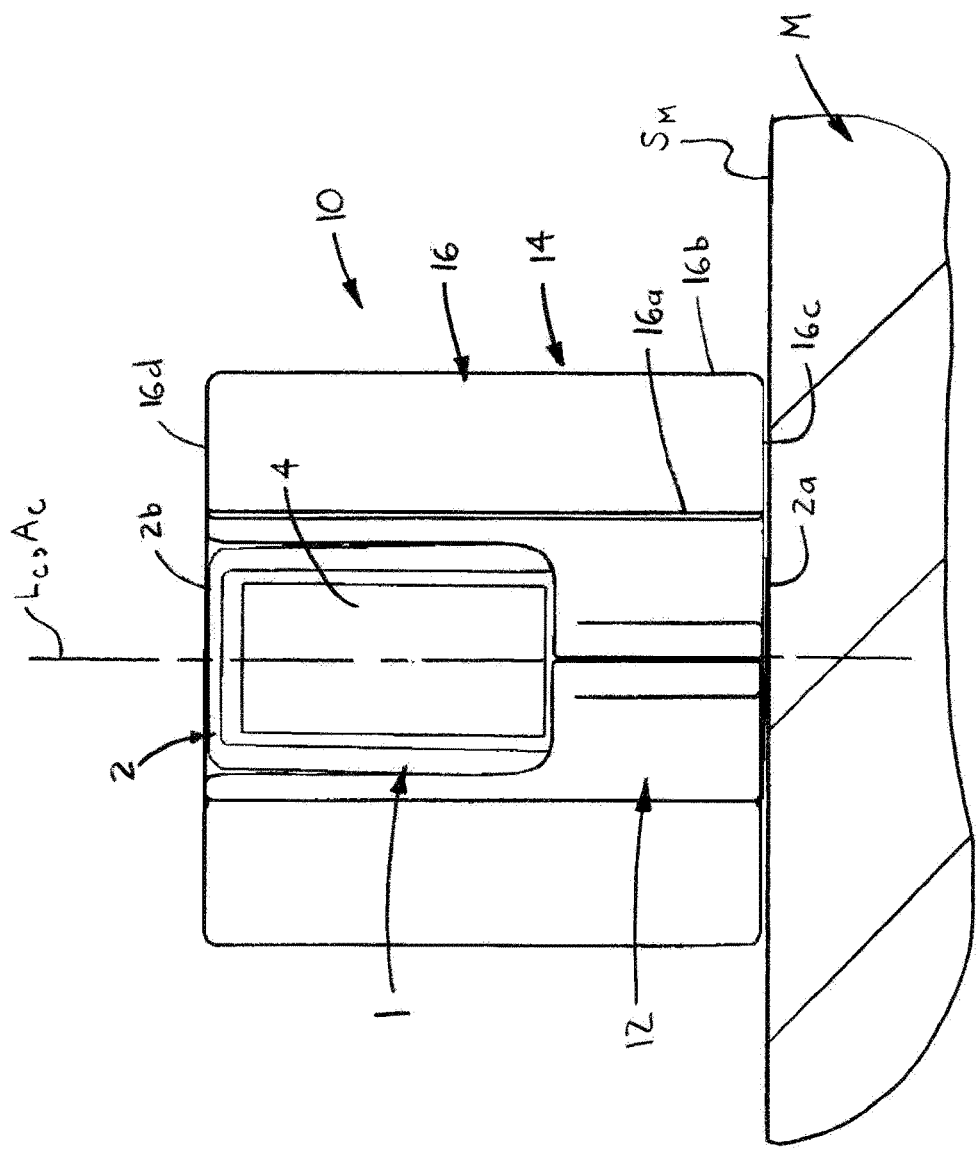
FIG. 1 is front plan view of a first construction sensor guard of the present invention, shown installed about a sensor mounted onto a machine surface.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-20 a guard 10 for a sensor 1, the sensor 1 having an elongated body 2 with a centerline $L_C$ and opposing ends 2a, 2b spaced apart along the centerline $L_C$. One end 2a of the sensor body 2 is mountable onto a mounting surface SM of a machine M such that the centerline $L_C$ is at least generally perpendicular to the mounting surface SM. Preferably, the sensor 1 is a condition monitoring sensor configured to detect at least vibration and/or temperature of the machine M, with the machine surface SM preferably being an outer surface of a bearing housing. Most preferably, the sensor 1 is a commercially available sensor, such as for example, a wireless, battery-powered SKF® Enlight Collect IMx-1 sensor manufactured and distributed by SKF of Gothenburg, Sweden. However, the sensor 1 may be any other type of sensor for detecting any desired machine parameter, either commercially available or specially manufactured, and used on any other type of machine or machine component.

The sensor guard 10 basically comprises a base 12 configured to be connected with the sensor 1 and a barrier 14 connected with the base 12 and configured to prevent contact with the sensor 1 in order to avoid damage to the sensor 1 and/or dislodgement of the sensor 1 from the machine mounting surface SM. Preferably, the base 12 is formed of a metallic material and the barrier 14 is formed of a polymeric material, but the base 12 and/or the barrier 14 may be formed of any appropriate material.

More specifically, the base 12 has a bore 13 with a central axis $A_C$, the bore 13 being configured to receive at least a portion of the sensor body 2. As such, the base 12 is disposed at least partially about the sensor 1 and the central axis $A_C$ is collinear with the centerline $L_C$. Further, the barrier 14 includes a body 16 with inner end 16a coupled with the base 12, an outer end 16b spaced radially from the central axis $A_C$ and opposing axial ends 16c, 16d. The barrier body 16 is configured to occupy at least an arcuate portion of a cylindrical space (not indicated) about the central axis $A_C$ of the base 12 so thereby prevent contact with the sensor body 2. That is, the barrier body 16 has a length $L_B$ (FIG. 9) along the central axis $A_C$ between the axial ends 16c, 16d which is about equal to the length (not indicated) of the sensor elongated body 2 (but may be longer or shorter) and the outer end 16b extends laterally or circumferentially and either partially or entirely about the central axis $A_C$ of the base 12.

Figure 2:
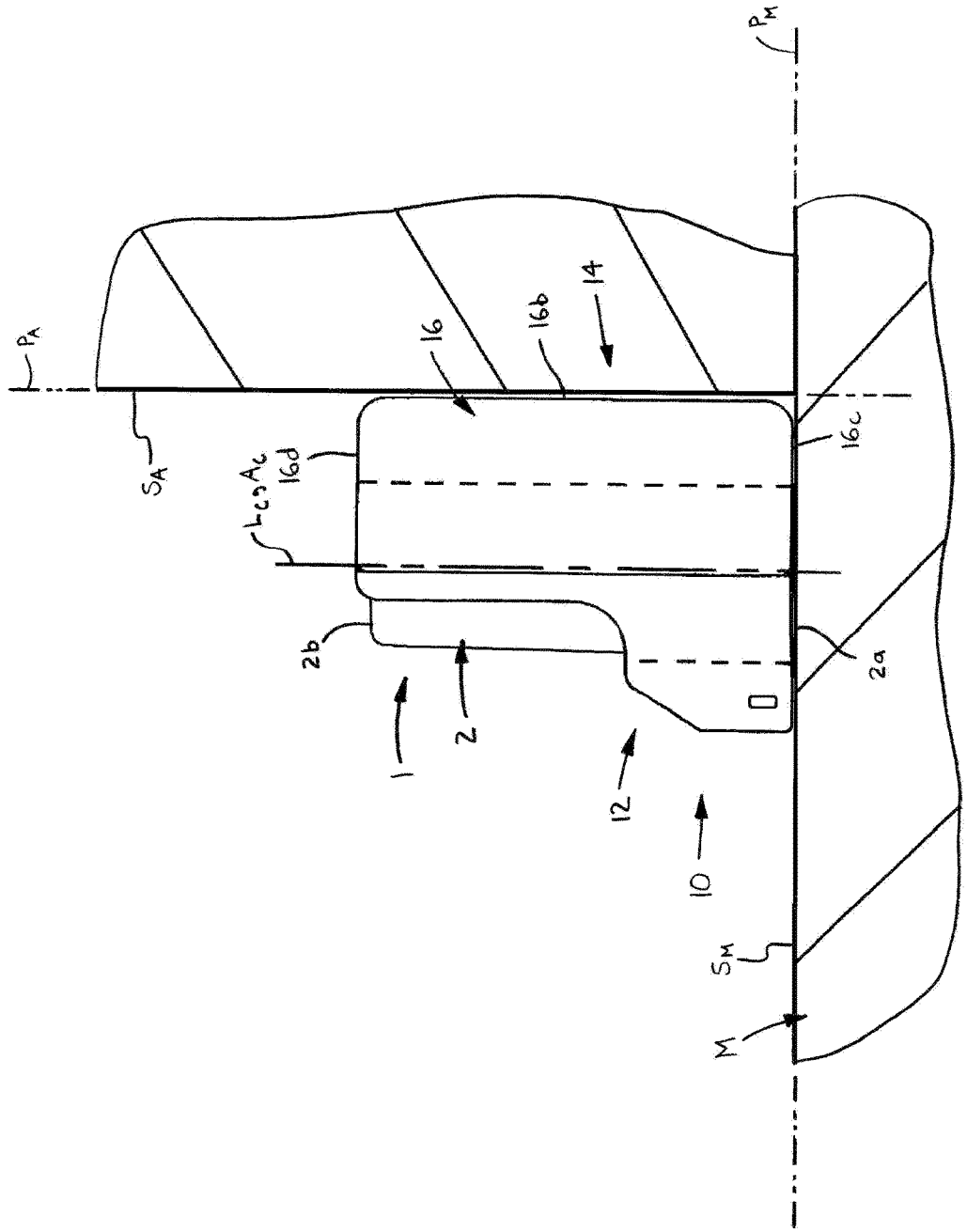
FIG. 2 is a side plan view of the first construction sensor guard, shown disposed about a sensor mounted on a machine surface and located adjacent to another machine surface.

In a first construction shown in FIGS. 1-5 and 9-16, the barrier body 16 has generally trapezoidal radial cross-sections and is formed to occupy only an arcuate portion of the cylindrical space about the base central axis $A_C$. Preferably, the first construction barrier body 16 is utilized when the sensor 1 is mounted adjacent to or within a certain distance from another surface $S_A$ of the machine M, or of a different machine or proximal object (none shown), which is disposed within a plane PA extending perpendicular to or intersecting with a plane $P_M$ containing the mounting surface SM, as depicted in FIG. 2 As such, the first construction guard 10 functions both to inhibit potentially damaging contact with the sensor 1 and to substantially occupy a major portion of the space between the sensor 1 and the other surface $S_A$ so as to prevent objects such as a tool (e.g., a screwdriver), a hand or foot of technician or machine operator, etc. from being inserted within the space and causing the sensor 1 to be dislodged or sheared from the mounting surface SM, particularly due to a "levering" action of the object against the other surface $S_A$.

Alternatively, in a second construction shown in FIGS. 17-20, the barrier body 16 is generally frustoconical and is formed to occupy an entire cylindrical space about the central axis $A_C$, and thus about the sensor 1. Preferably, the second construction barrier body 16 is used when the sensor 1 projects from the machine mounting surface SM at a location in which there are no proximal perpendicular or intersecting surfaces of the machine M or other object. As such, the second construction guard 10 functions to prevent impacts or other contact from an object which may approach the sensor 1 from any direction about the perimeter surrounding the central axis $A_C$.

Thus, both constructions of the sensor guard 10 effectively protect the sensor 1 from damage while each is optimized for a different mounting arrangement of the sensor 1. Having described the basic structure and functions above, these and other features of the sensor guard 10 of the present invention are described in further detail below.

Referring now to FIGS. 5-8, the base 12 preferably has the same structure when used with either construction of the barrier 14, although the base 12 has certain features of greater utility when used with the first barrier construction. Specifically, the base 12 has a body 18 shaped generally as a "cut out" rectangular solid and includes a partially annular clamp portion 20 and a generally rectangular connective portion 22 integral with the clamp portion 20. The base body 18 has opposing first and second axial ends 18a, 18b spaced apart along the central axis $A_C$ and the bore 13 extends between the two ends 18a, 18b and through both the clamp portion 20 and the connective portion 22. As such, the sensor 1 is disposable simultaneously within the two base portions 20, 22.

Preferably, the base clamp portion 20 is located adjacent to the body first axial end 18a and has a first axial length $l_{A1}$ and the base body 18 further has a cut-out portion 24 including two spaced apart side walls 26A, 26B each extending from the clamp portion 20 to the body second axial end 18b. The cut-out portion 24 has a second axial length $l_{A2}$ which is greater than the first axial length $l_{A1}$ of the clamp portion 20. As such, the cut-out portion 24 provides relatively substantial "window" which enables a machine operator to view a display 4 (FIG. 1) or other visual indicator(s) (e.g., one or more lights) on the sensor 1.

Further, the clamp portion 20 includes two arcuate arms 30, 32 each having an inner end 30a, 32b, respectively, integrally formed with the connective portion 22 and an outer end 30b, 32b disposed against the outer end 32b, 30b of the other arcuate arm 32, 30. Preferably, the arms 30, 32 are configured to engage about flats (not shown) adjacent to a base end of the preferred sensor 1, but may be formed to engage with any other appropriate portion of the preferred sensor 1 or any other sensor 1. More specifically, the two arms 30, 32 are each deflectable about the inner end 30a, 32a of the arm 30, 32 in a direction generally away from the other arm 32, 30 so as to temporarily increase the diameter DB (FIG. 7) of the base bore 13, thereby facilitating entry of the sensor 1 into the bore 13 during installation of the guard 10.

Also, each arm 30, 32 of the base clamp portion 20 preferably includes a flange 34 extending radially outwardly from the outer end 30b, 32b of the arm 30, 32. Each flange 34 has a hole 36 aligned with the hole 36 in the other arm flange 34 and the two holes 36 are configured to receive a fastener (none shown), such as a bolt, screw, flexible strap, etc., to secure the two arms 30, 32 about the sensor 1. However, the arms 30, 32 are preferably formed to secure the sensor 1 within the base bore 13 solely by friction generated by clamping pressure of the two arms 30, 32 against the sensor 1.

Furthermore, the base connective portion 22 has two opposing axial ends 22a, 22b and two opposing outer side surfaces extending 23A, 23B between the two axial ends 22a, 22b, and an end surface 25 extending laterally between the side surfaces 23A, 23B. Each one of the outer side surfaces 23A, 23B includes at least one and preferably plurality of parallel axial splines 27 extending between the two axial ends 22a, 22b of the connective portion 22. As such, a separate one of a plurality of axial grooves 29 is defined between each pair of adjacent splines 27. Preferably, the splines 27 and grooves 29 are arranged "staggered" on each surface 23A, 23B such that each spline 27 on one outer side surface 23A or 23B is radially aligned (i.e., spaced an equal radial distance from the central axis $A_C$) with a groove 29 on the other outer side surface 23B, 23A, respectively, for reasons discussed below.

Figure 5:
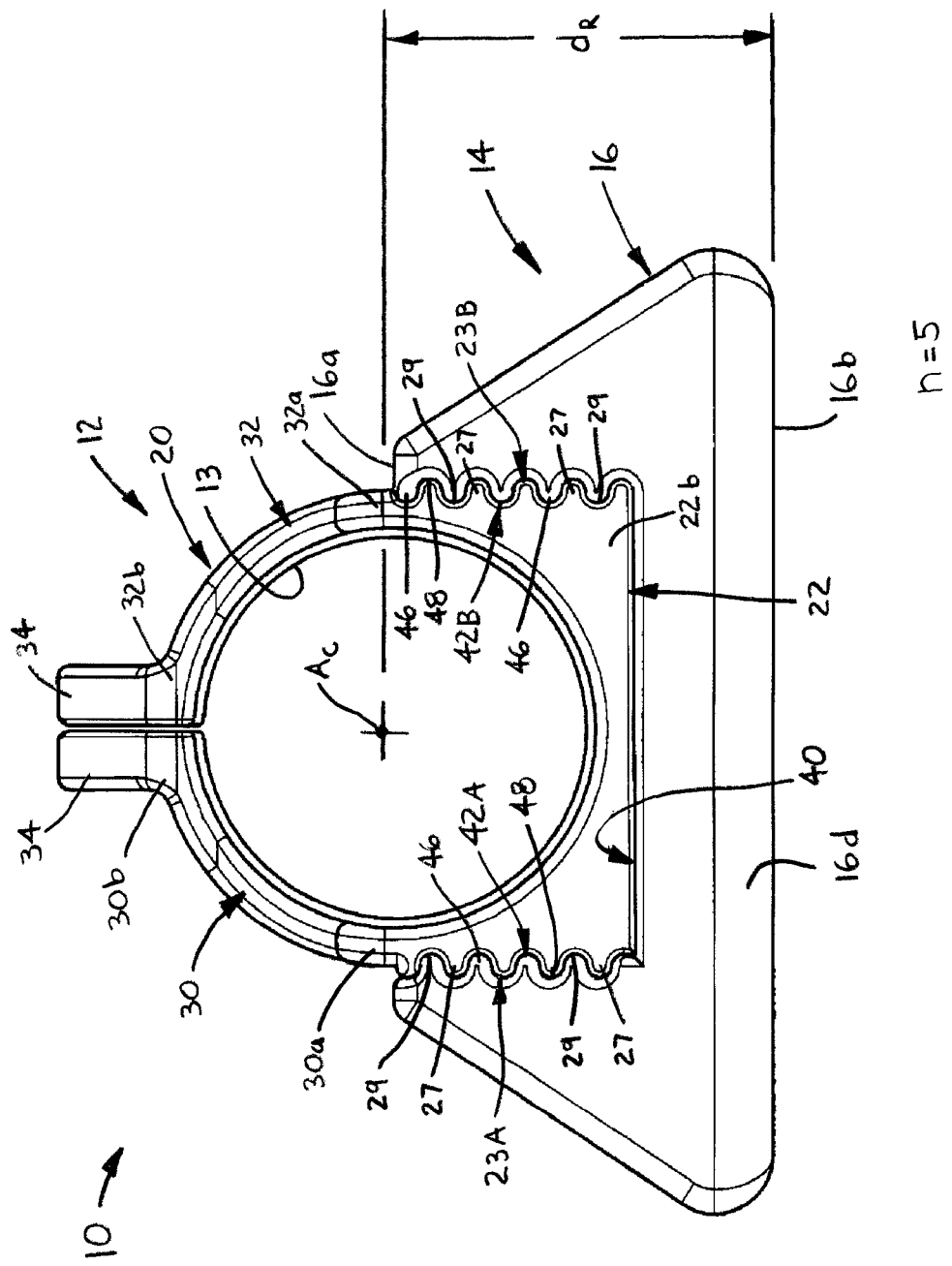
FIG. 5 is a top plan view of the first construction sensor guard.
Figure 6:
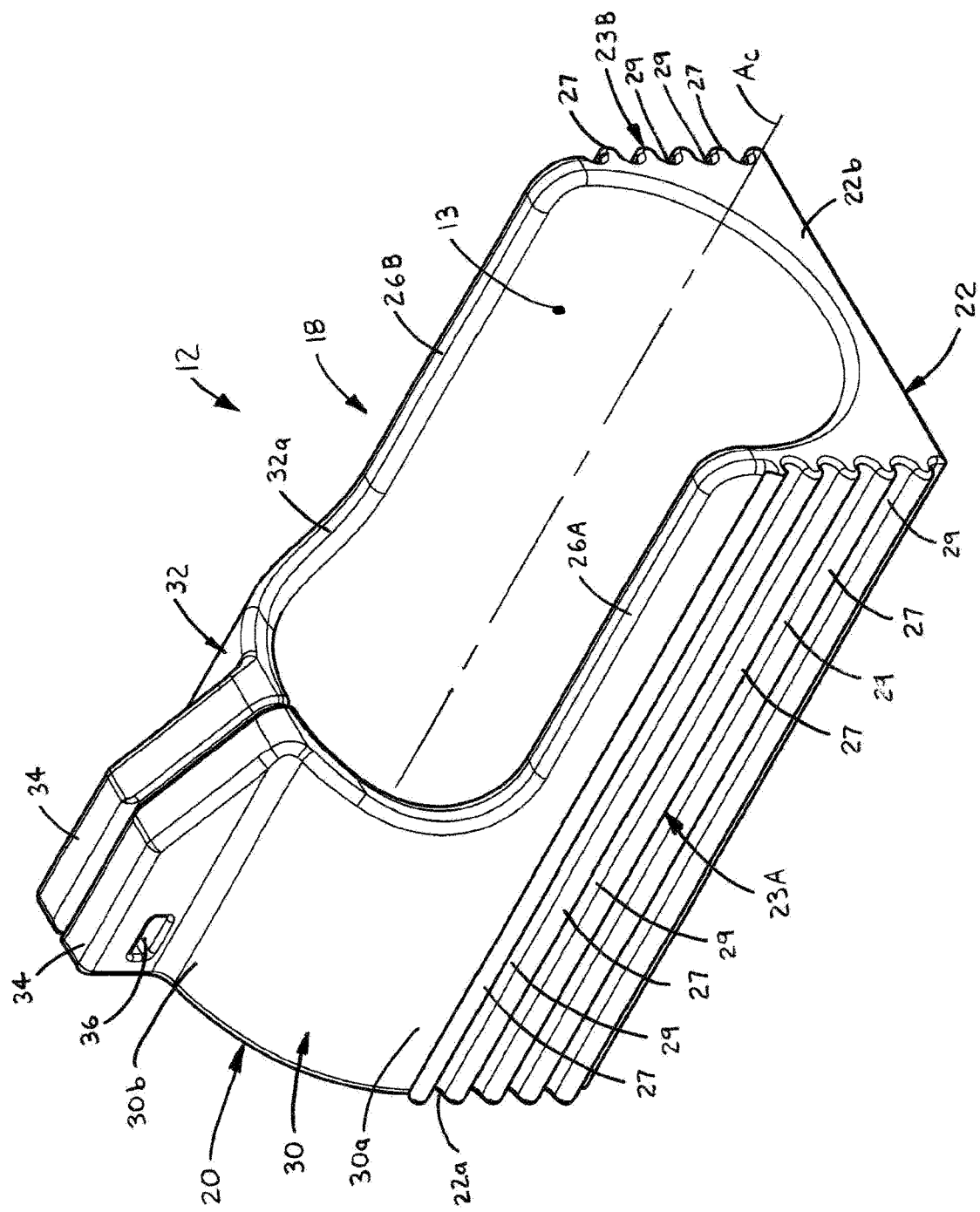
FIG. 6 is a perspective view of a base of the sensor guard.
Figure 7:
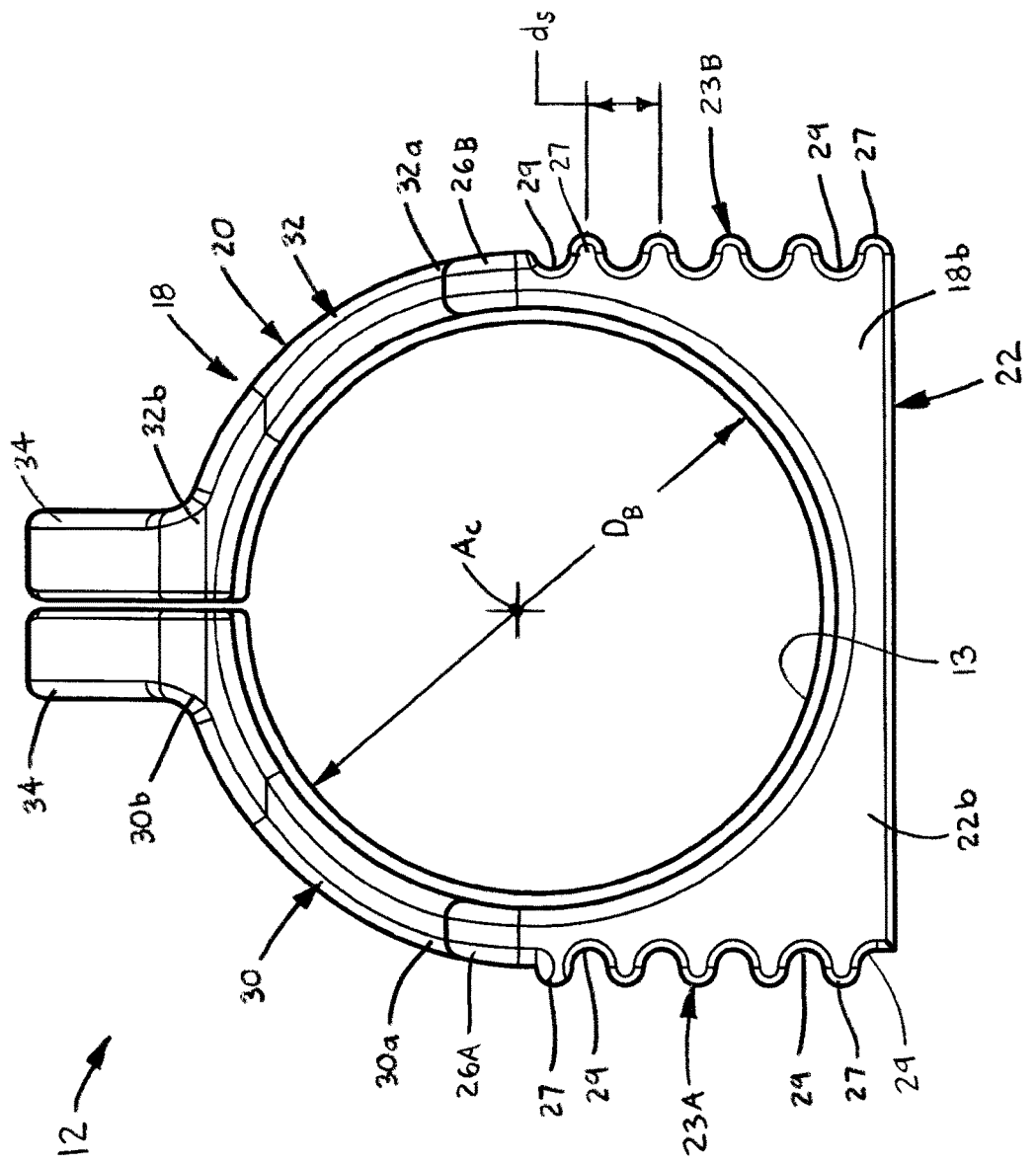
FIG. 7 is a top plan view of the base.
Figure 8:
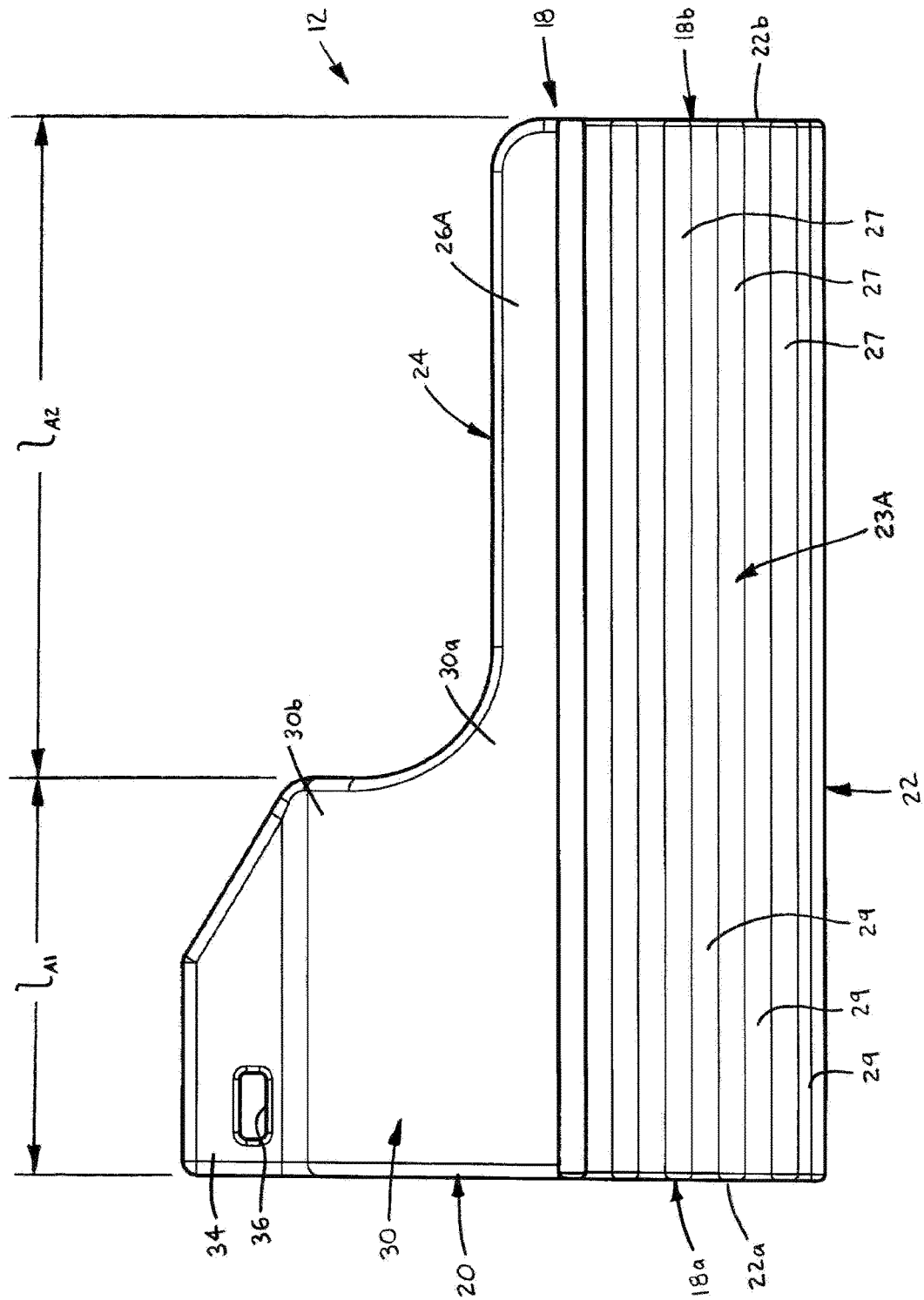
FIG. 8 is a side plan view of the base.
Figure 9:
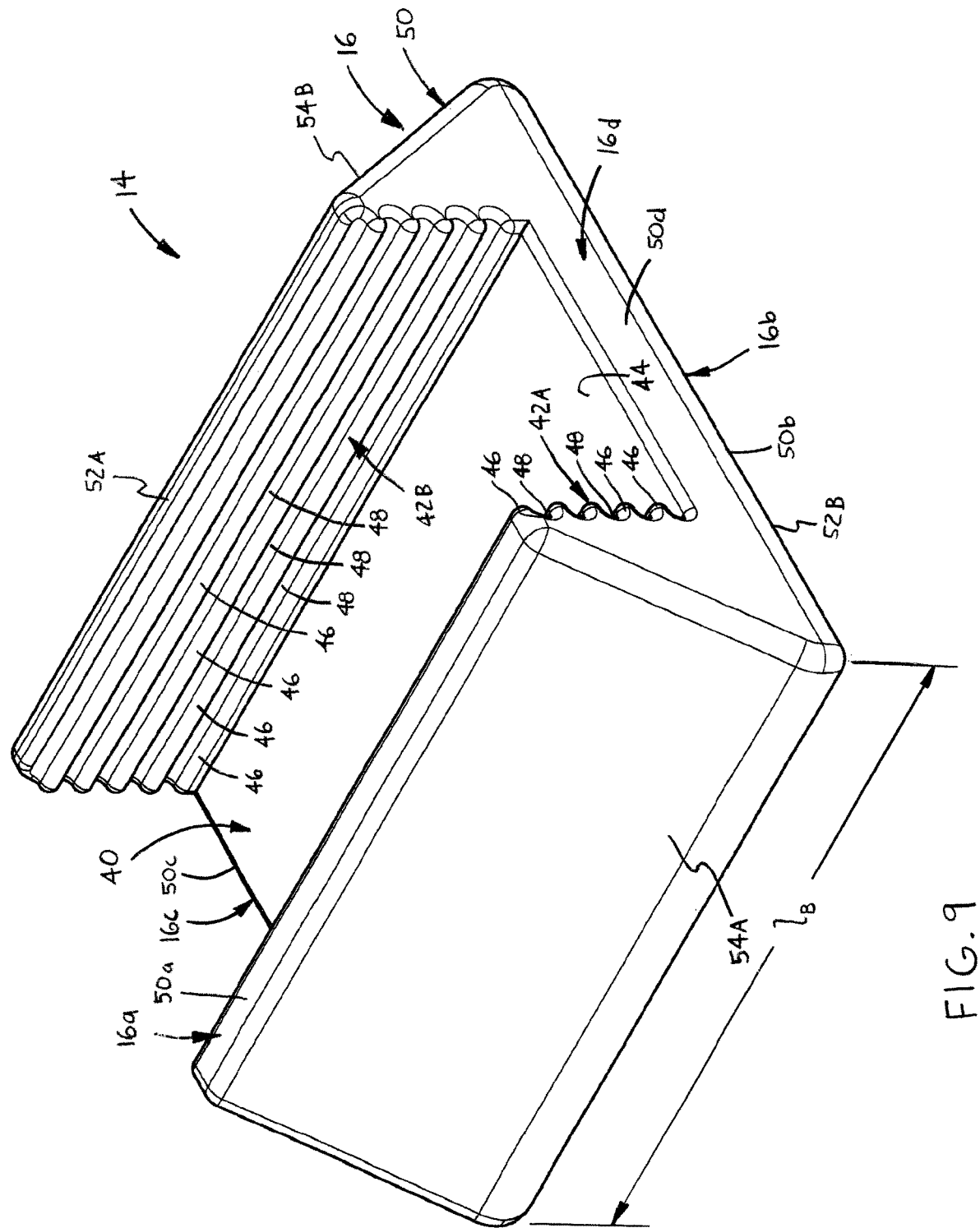
FIG. 9 a perspective view of a barrier of the first construction sensor guard.
Figure 10:
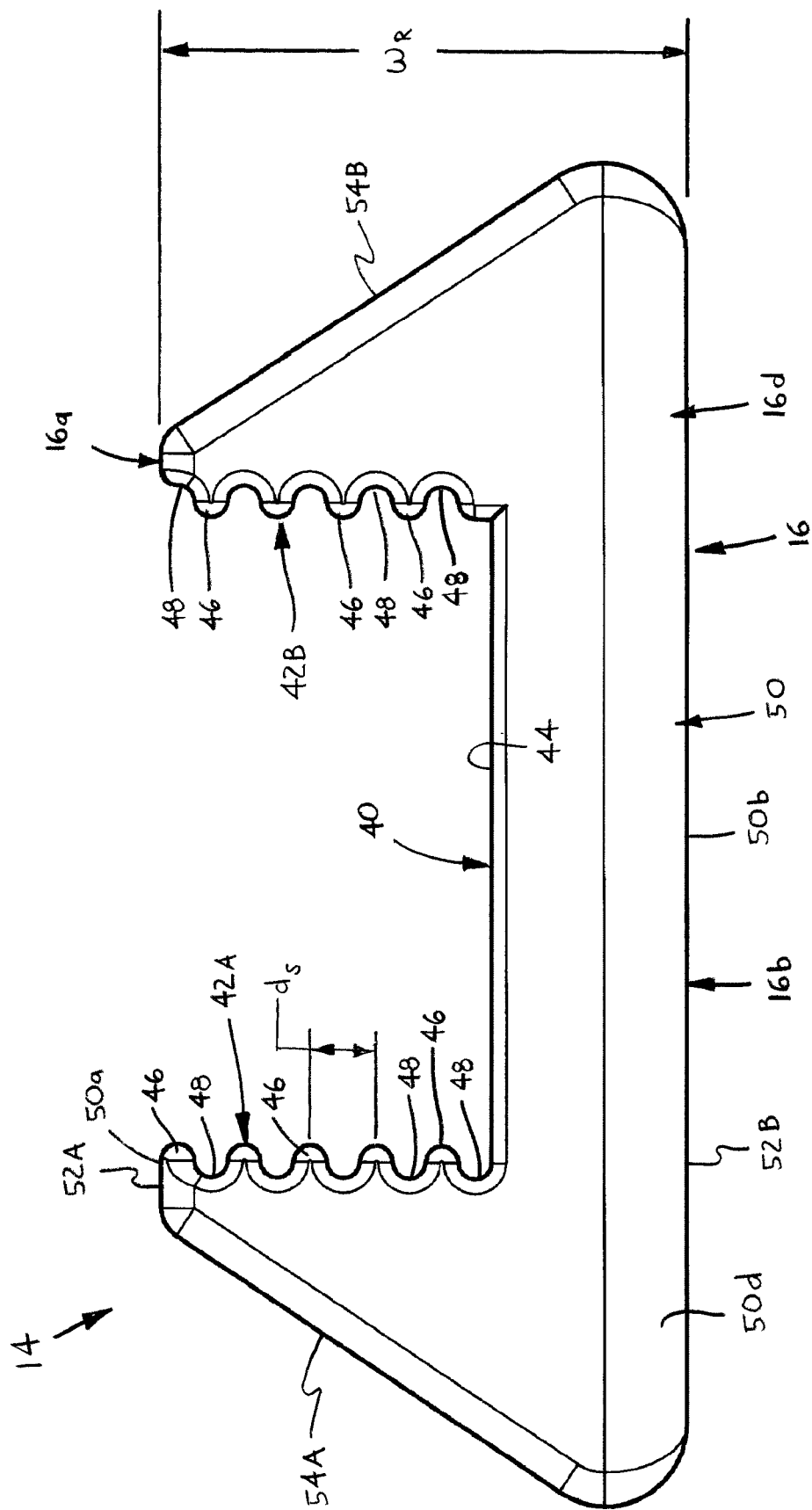
FIG. 10 is a top plan view of the barrier of the first construction sensor guard.

Referring to FIGS. 5, 9 and 10, the barrier body 16 preferably includes a channel 40 extending inwardly from the body inner end 16a toward the body outer end 16b and configured to receive the base connective portion 22 so as to couple, preferably both removably and adjustably, the barrier 14 with the base 12. More specifically, the channel 40 is preferably generally rectangular and defined by two facing inner side surfaces 42A, 42B extending between the two axial ends 16c, 16d of the body 16 and an inner end surface 44 extending laterally between the two inner side surfaces 42A, 42B. Each one of the inner side surfaces 42A, 42B of the barrier body channel 40 includes at least one and preferably a plurality of parallel axial splines 46 extending between the first and second axial ends 16c, 16d of the barrier body 16. As such, a plurality of axial grooves 48 are each defined between each pair of adjacent splines 46 of the barrier body 16, and are preferably arranged such that each spline 46 on one inner side surface 42A or 42B is radially aligned (i.e., spaced an equal radial distance from the central axis $A_C$) with a groove 48 on the other inner side surface 42B, 42A, respectively.

With the above-described structure of the base connective portion 22 and the barrier channel 40, when the barrier 14 is coupled with the base 12, each outer side surface 23A, 23B of the base connective portion 22 is disposed against a separate one of the two facing inner side surfaces 42A, 42B, respectively, of the barrier channel 40. Further, at least one and preferably a plurality of splines 27 of each outer side surface 23A, 23B of the base connective portion 22 is disposed within one groove 48 of one of the two inner side surfaces 42A, 42B of the barrier body 16, and at least one and preferably a plurality of splines 46 of each barrier channel inner side surface 42A, 42B is disposed within one groove 29 of one of the two base connective portion outer side surfaces 23A, 23B. Thereby, the barrier body 16 is both removably and adjustably coupled with the base body 18 in the first barrier body construction, but only removably coupled with the second barrier body construction, as each is described in further detail below.

With the first construction of the barrier body 16, by varying the number of splines 27, 46 engaged with the associated grooves 48, 29, respectively, the radial distance $d_R$ between the central axis $A_C$ of the base 12 and the outer end 16b of the barrier body 16 can be varied or adjusted. Specifically, the greater the number of splines 27, 46 engaged with the associated grooves 48, 29, the lesser the radial distance $d_R$, and alternatively, the lesser the number of splines 27, 46 engaged with the associated grooves 48, 29, the greater the radial distance $d_R$. Furthermore, due to the staggered nature of the splines 27, 46 and the grooves 48, 29 as described above, the radial distance $d_R$ can be adjusted by a "half step" increment of length equal to half of the spacing distance ds (FIGS. 7 and 10) between each pair of adjacent splines 27 or 46 or each pair of adjacent grooves 29 or 49 (not indicated).

Specifically, in one arrangement shown in FIG. 5, the barrier body first axial end 16c is adjacent to the base body first axial end 18a (and thus to the mounting surface SM) and the barrier body second end 16d is adjacent to the base body second end 18b, and a number n of the splines 27, specifically n=5, on the first outer surface 23A of the base connective portion 22 engage with an equal number n of the grooves 48 formed in the first inner surface 42A of the barrier channel 40, while the same number n of the barrier splines 46 on the barrier channel first inner surface 42A engage with an equal number n of base connective portion grooves 27 in the base connective portion first outer surface 23A. Simultaneously, the same number n of the splines 27 on the second outer surface 23B of the base connective portion 22 engage with an equal number n of the grooves 48 formed in the second inner surface 42B of the barrier channel 40, while the same number n of the barrier splines 46 on the barrier channel second inner surface 42A engage with an equal number of base connective portion grooves 27 formed in the base connective portion second outer surface 23B.

Figure 12:
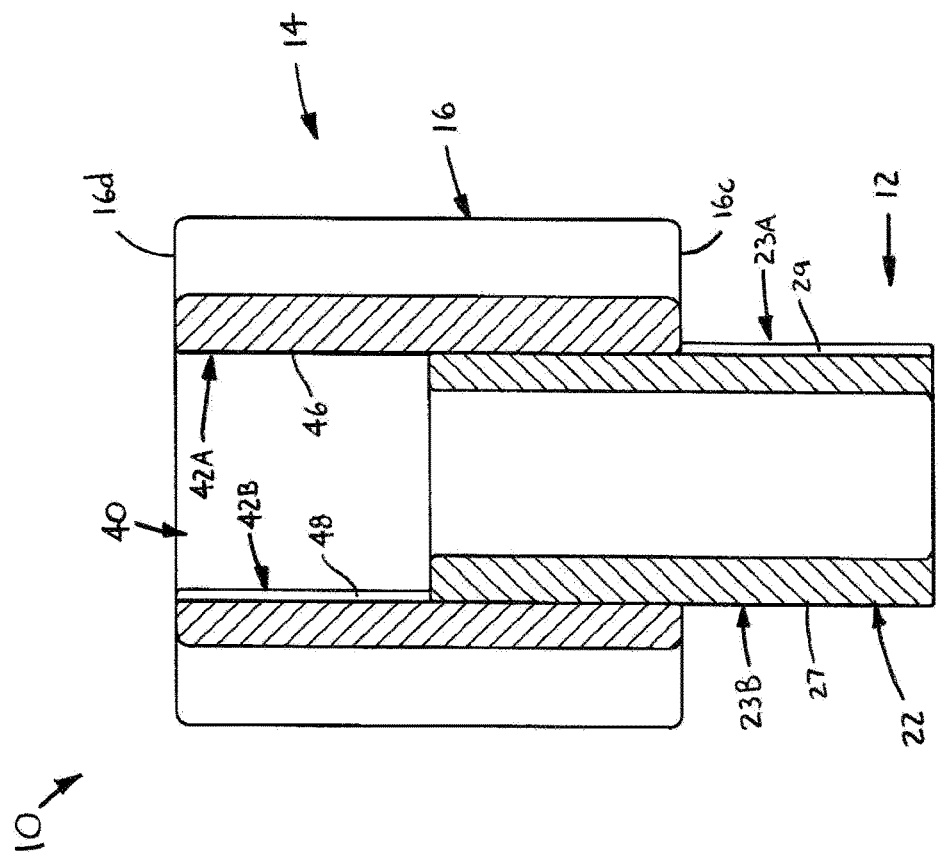
FIG. 12 is a cross-sectional view through line 12-12 of FIG. 11.
Figure 11:
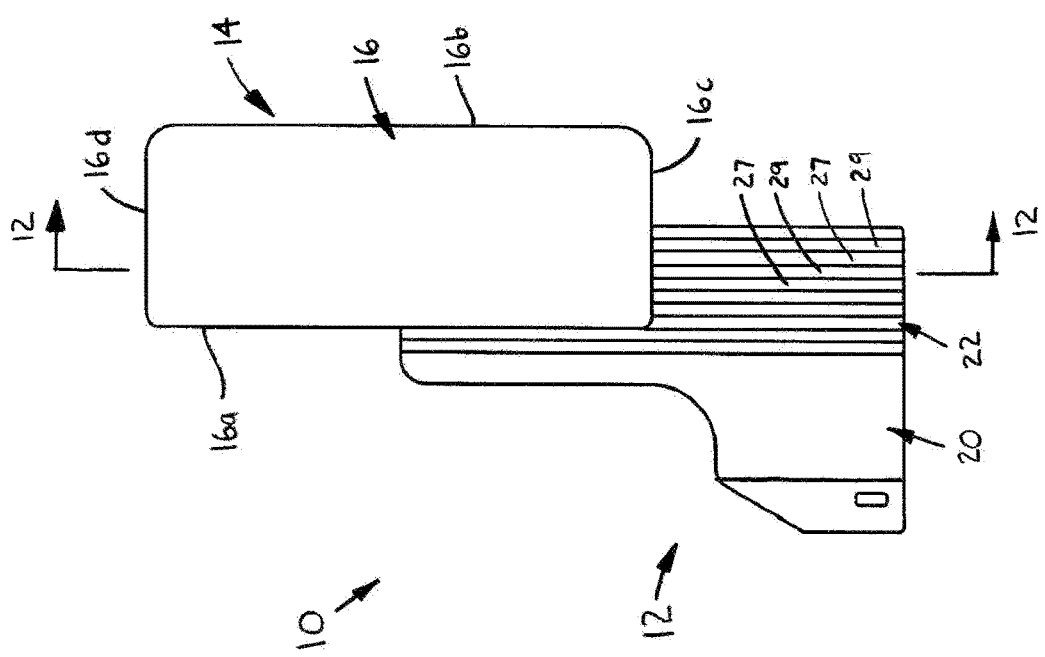
FIG. 11 is a side plan view of the first construction sensor guard, showing the barrier being slid relative to the base during assembly or disassembly.

To adjust the radial distance $d_R$ by half of the spacing distance ds (i.e., a half step adjustment), the barrier 14 can be slid off of the base 12, as depicted in FIGS. 11 and 12, and then rotated 180 degrees so as to invert the orientation of the axial ends 16c, 16d of the barrier body 16 (i.e., the second axial end 16d is more adjacent to the mounting surface SM than the first axial end 16c) and then slid back onto the base 12 such that the number of pairs of engaged splines/grooves 27/48 and 46/29 is unequal, as depicted in FIG. 13. Specifically, as the base connective portion 22 engages with the barrier channel 44, a number n−1 of the splines 27, specifically (4) splines 27, on the first outer surface 23A of the base connective portion 22 engage with the equal number n−1 of the grooves 48 of the barrier channel second inner surface 42B and a number of n (i.e., 5) of the splines 46 of the barrier channel second inner surface 43B engage with a corresponding number n of the grooves 29 of the base connective portion first outer surface 23A. At the same time, the number n of the splines 27 on the second outer surface 23B of the base connective portion 22 engage with the equal number n of the grooves 48 of the barrier channel first inner surface 42A and the number n−1 of the splines 46 of the barrier channel first inner surface 42A engage with a corresponding number n−1 of the grooves 29 of the base connective portion second outer surface 23B. The barrier body 16 is slid onto the base body 18 until the barrier body second axial end 16d is adjacent to the base body first axial end 18a and the barrier body first axial end 16c is adjacent to the base body second axial end 18b.

Figure 15:
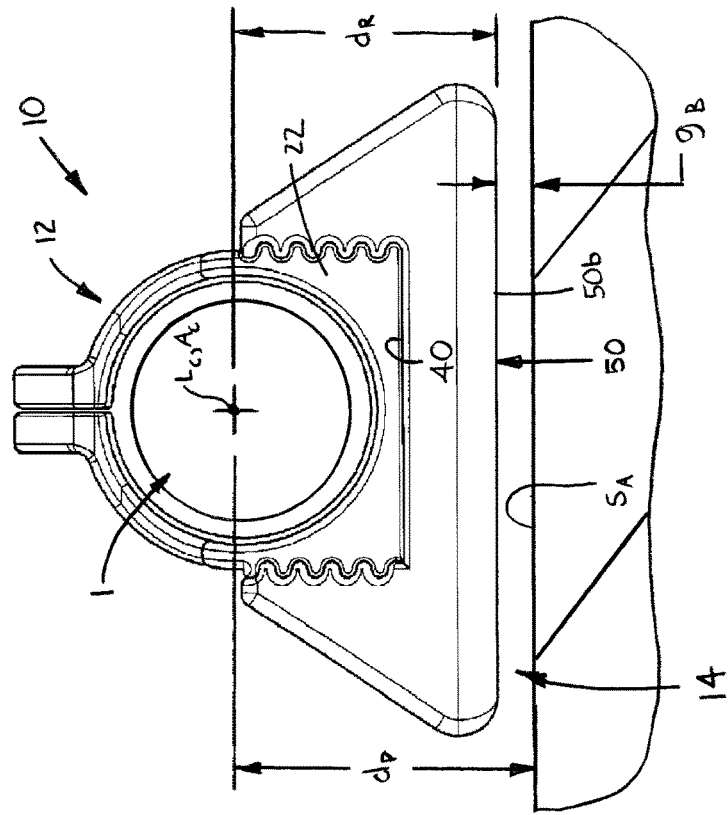
FIG. 15 is a top plan view of the first construction sensor guard disposed about a sensor, showing a barrier spaced from another machine surface by a gap.
Figure 17:
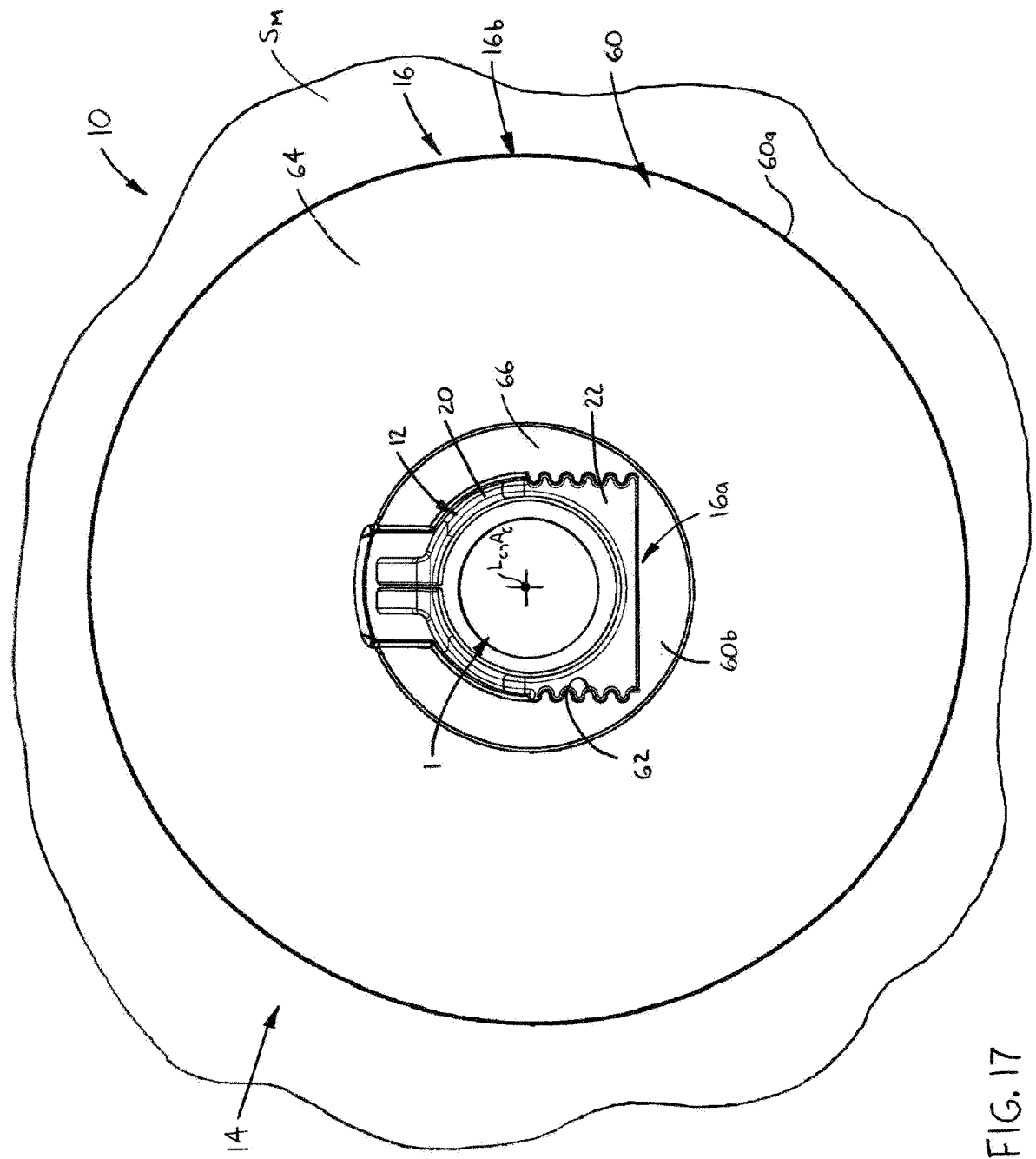
FIG. 17 is a top plan view of a second construction sensor guard of the present invention, shown disposed on a sensor mounted on a machine surface.
Figure 18:
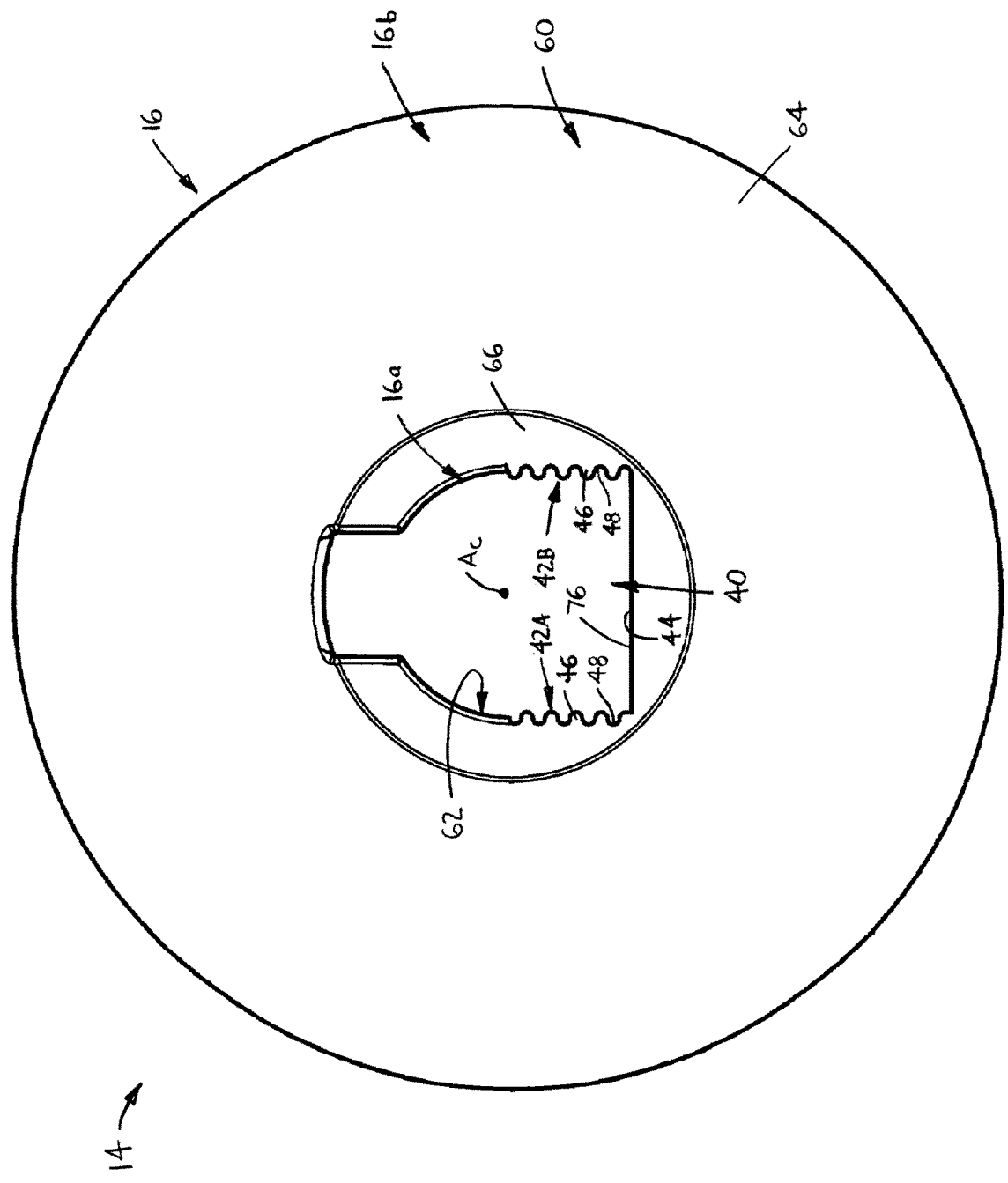
FIG. 18 is a top plan view of a barrier of the second construction sensor guard.
Figure 19:
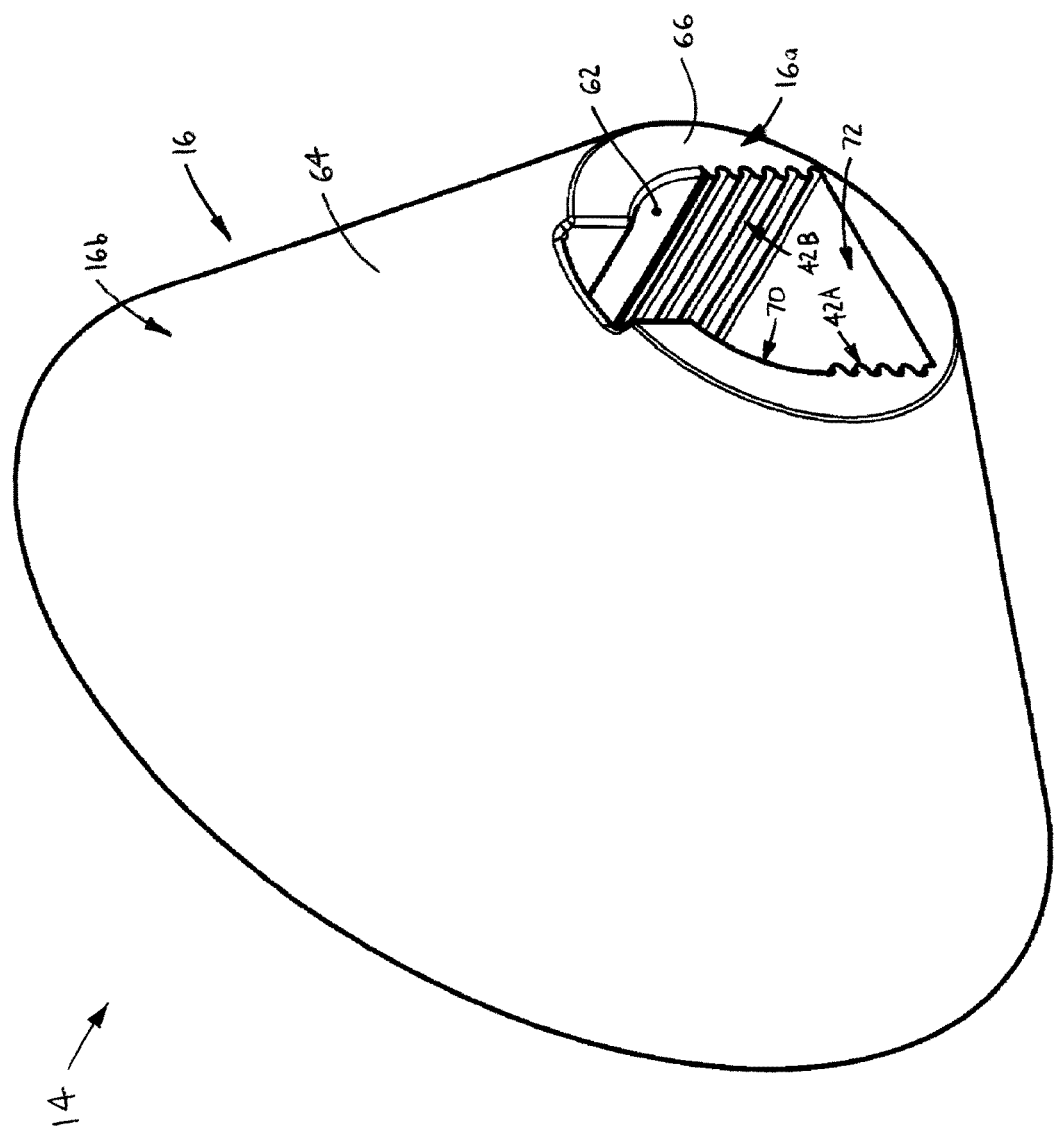
FIG. 19 is a top perspective view of the barrier of the second construction sensor guard.
Figure 20:
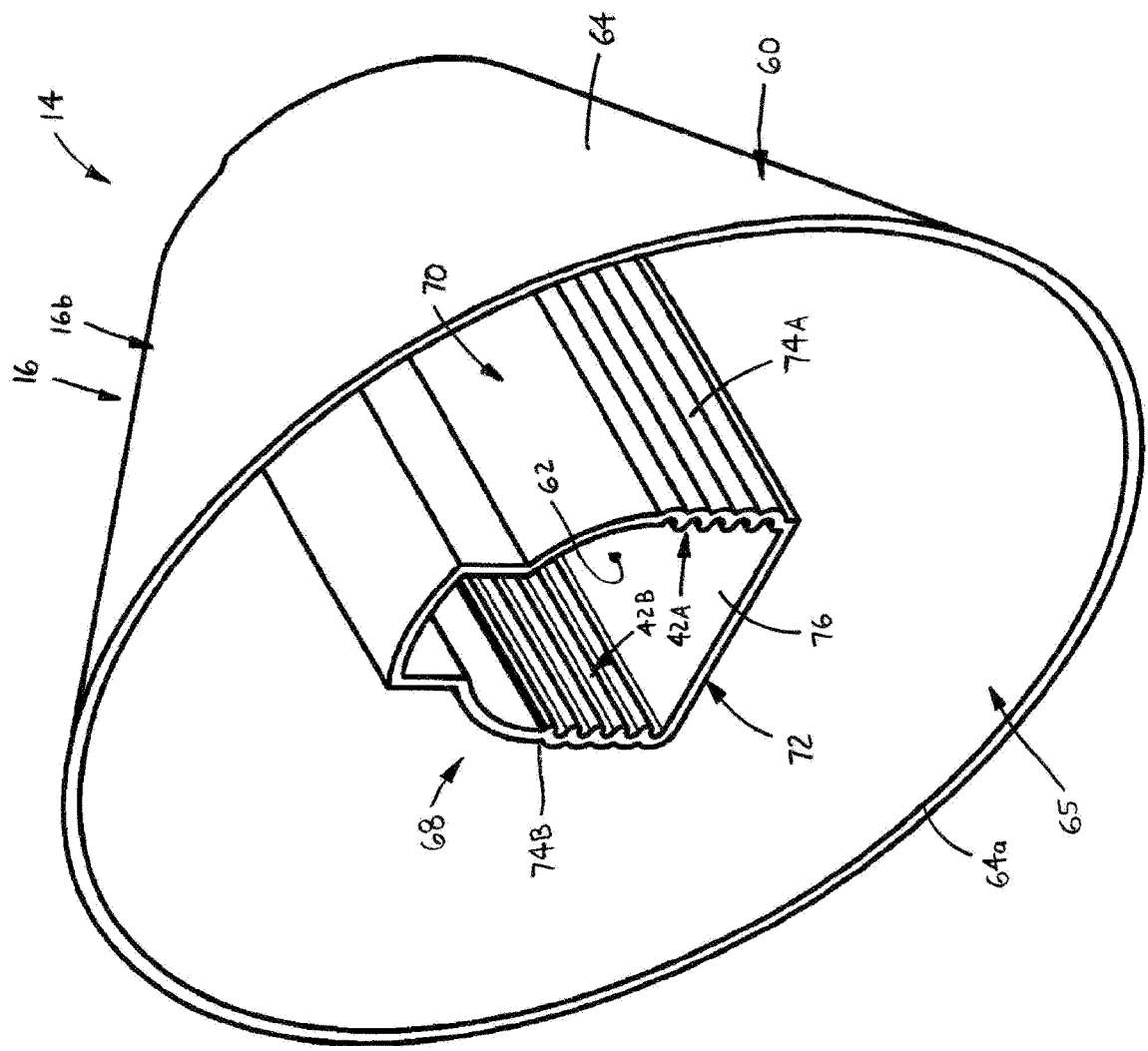
FIG. 20 is a bottom perspective view of the barrier of the second construction sensor guard.

Furthermore, to adjust the radial distance $d_R$ by the entire spacing distance ds (i.e., a full step adjustment), the barrier body 16 may be removed from the base 12 and then reinstalled in the same relative orientation, but with the number n of splines 27, 46 and grooves 29, 48 engaged being increased or decreased (i.e., n+1, n+2, n−1, etc.), the arrangement shown in FIG. 14 depicting an equal number of engaged spline/groove pairs of n=4. In particular, the adjustment of the radial distance $d_R$ is important for applications of the first barrier body construction in order to adapt to a particular distance between the sensor centerline $L_C$ and the adjacent machine surface $S_A$, specifically to vary a width (and preferably close) a gap $g_B$ between the barrier outer end 16b and the machine surface $S_A$, as depicted in FIG. 15 and described in further detail below.

Figure 16:
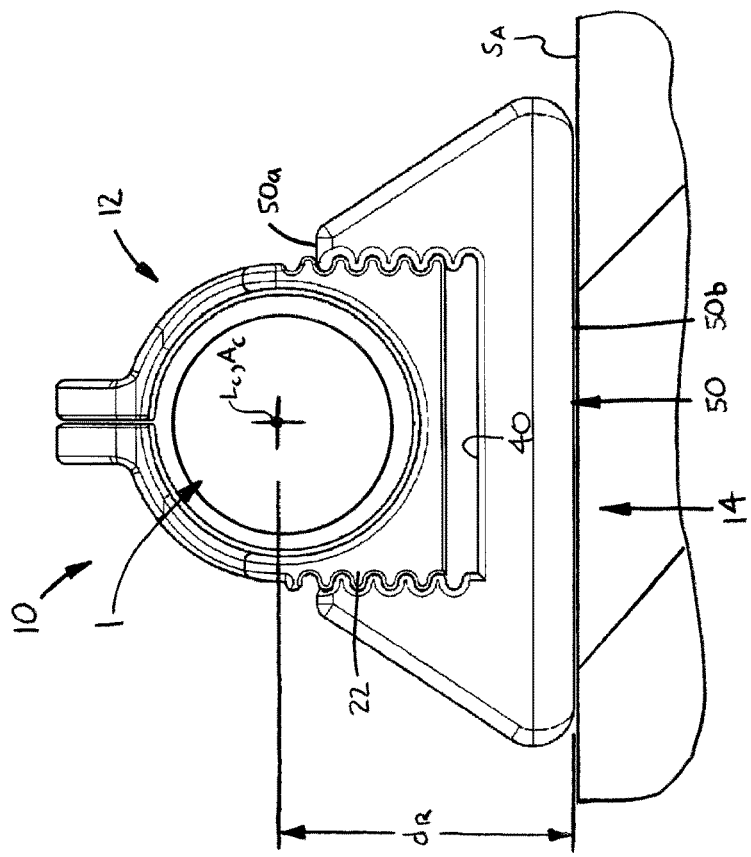
FIG. 16 is another view of the sensor guard and the sensor of FIG. 15, showing the position of the barrier relative to the base being adjusted to reduce the gap.

Referring now to FIGS. 9, 10, 15 and 16, in the first construction of the barrier body 16, the body 16 is preferably formed generally as a trapezoidal prism 50 and has an inner radial end 50a connected with the base 12, an outer radial end 50b spaced radially from the inner end 50a by a radial width $w_R$ (FIG. 10), and opposing axial ends 50c, 50d. The trapezoidal prism body 50 has an inner base surface(s) 52A at the body inner end 50a, an outer base surface 52B at the body outer end 50b and two leg surfaces 54A, 54B converging from the outer base surface 52B to the inner base surface 52B. Further, the trapezoidal barrier body 50 is preferably sized such that the radial width $w_R$ of the body 50 has a value of at least half of, and most preferably a substantial percentage of, a perpendicular spacing distance $d_P$ (FIG. 15) between the central axis $A_C$ of the base 12 and the other, adjacent surface $S_A$ of the machine 1, as discussed above. By selective engagement of the barrier channel 40 and the base connective portion 22, the outer end 50b of the trapezoidal barrier body 50 is positionable in close proximity to, or even contacting, the adjacent machine surface $S_A$ to reduce or eliminate the gap $g_B$, and thereby substantially obstruct the intervening space between the surface $S_A$ and the sensor 1, as best shown in FIG. 16.

Referring to FIGS. 17-20, in the second construction, the barrier 14 includes a frustoconical body 60 having a radially-larger first axial end 60a disposable against the mounting surface SM, a radially-smaller second axial end 60b spaced from the mounting surface SM along the central axis $A_C$, and a central bore 62 extending between the first and second axial ends 60a, 60b. The base 12 is disposed within the central bore 62 of the barrier body 60 so as to removably connect the barrier 14 with the base 12. More specifically, the frustoconical barrier body 60 has a frustoconical side wall 64 with a circular edge 64a at the first axial end 60a defining an opening 65 and a circular end wall 66 at the second axial end 60b. A central, enclosed tubular wall 68 extends axially inwardly from the end wall 66 toward the first end 60a of the body 60 and provides the central bore 62 of the barrier body 60.

Preferably, the tubular wall 68 of the frustoconical barrier body 60 includes a partially annular portion 70 disposed about the base clamp portion 20 and a rectangular portion 72 disposed about the base connective portion 22. The rectangular portion 72 of the tubular wall 68 provides the barrier channel 40 and has two spaced apart rectangular walls 74A, 74B formed with a plurality of axial splines 46 and axial grooves 48 in facing inner surfaces 42A, 42B, and a connecting rectangular wall 76. As such, the frustoconical body 60 is preferably non-adjustably coupled with the base 12 by the engagement of all of the splines 46 and the grooves 48 of the tubular wall rectangular portion 72 with all of the associated grooves 29 and splines 27 of the base connective portion 22 as discussed in detail above. However, the tubular wall 68 can be formed in any other appropriate manner to receive and connect with the base 12, such as for example, entirely annular and configured to receive the base 12 with only a simple friction fit.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A guard for a sensor, the sensor having an elongated body with a centerline and opposing ends spaced apart along the centerline, one end of the sensor body being mountable on a mounting surface of a machine such that the centerline is perpendicular to the mounting surface, the guard comprising:

a base having a bore with a central axis, the bore being configured to receive at least a portion of the sensor body such that the base is disposed at least partially about the sensor and the central axis is collinear with the centerline; and a barrier coupled with the base and configured to occupy at least an arcuate portion of a cylindrical space about the central axis of the base so as to prevent contact with the sensor body;

wherein the base includes a partially annular clamp portion configured to be disposed about the sensor and a generally rectangular connective portion integral with the clamp portion and connected with the barrier, the bore extending through both the clamp portion and the connective portion.

2. The sensor guard as recited in claim 1, wherein the base includes first and second axial ends spaced apart along the central axis, the clamp portion being located adjacent to the first axial end and having a first axial length, the base further including a cut-out portion including two spaced apart side walls each extending from the clamp portion to the second axial end, the cut-out portion having a second axial length greater than the first axial length of the clamp portion.

3. The guard as recited in claim 1, wherein the clamp portion includes two arcuate arms each having an inner end integrally formed with the connective portion and an outer end disposed against the outer end of the other arcuate arm, each one of the two arms being deflectable about the inner end of the arm in a direction away from the other arm so as to increase a diameter of the bore to facilitate assembly of the sensor into the base.

4. The guard as recited in claim 3, wherein each one of the two arcuate arms of the base clamp portion includes a flange extending radially outwardly from the outer end of the arm, each flange having a hole aligned with the hole in the other flange and the two holes being configured to receive a fastener to secure the two arms about the sensor.

5. The guard as recited in claim 1, wherein:
the base connective portion is generally rectangular and has two opposing axial ends and two opposing outer side surfaces extending between the two axial ends, each one of the outer side surfaces of the base connective portion including a plurality of parallel axial splines extending between the two axial ends of the connective portion, a separate one of a plurality of axial grooves being defined between each pair of adjacent splines; and
the barrier includes a body having an inner radial end, an outer radial end, two opposing axial ends and a rectangular channel extending from the inner radial end toward the outer radial end, the channel being generally rectangular and defined by two facing inner side surfaces extending between the two axial ends and a base surface extending between the two inner side surfaces, each inner side surface being disposed against a separate one of the two outer side surfaces of the base connective portion, each one of the inner side surfaces of the channel of the barrier body including a plurality of parallel axial splines extending between the two axial ends of the barrier body and a plurality of axial grooves each being defined between each pair of adjacent splines of the barrier body;
wherein at least one spline of each outer side surface of the base connective portion is disposed within one groove of one of the two inner side surfaces of the barrier channel and at least one spline of each outer side surface of the barrier channel is disposed within one groove of one of the two outer side surfaces of the base connective portion.

6. The guard as recited in claim 1, wherein the barrier includes a body with a length along the central axis, the length of the barrier body being about equal to a length of the sensor elongated body.

7. The guard as recited in claim 1, wherein the barrier includes a body with an outer end spaced radially from the central axis of the base, the outer end extending partially or entirely about the central axis of the base.

8. The guard as recited in claim 1, wherein the barrier includes a body having an inner end connected with the base and an outer end spaced radially from the inner end by a radial width, the radial width of the barrier body having a value of at least half of a perpendicular distance between the centerline of the sensor and another surface of the machine or of another object that is disposed within a plane extending perpendicular to or intersecting with a plane containing the mounting surface.

9. The guard as recited in claim 8, wherein the barrier body is formed as a trapezoidal prism having an inner base surface at the body inner end, an outer base surface at the body outer end and two leg surfaces converging from the outer base surface to the inner base surface.

10. The guard as recited in claim 8, wherein the barrier body is adjustably coupled with the base so as to vary a width of a gap between the outer end of the barrier body and the other machine surface.

11. The guard as recited in claim 10, wherein:
the base includes a body with a generally rectangular connective portion, the connective portion having first and second axial ends and two opposing outer side surfaces extending between the first and second axial ends, each one of the outer side surfaces of the base connective portion including a plurality of parallel axial splines extending between the first and second axial ends of the connective portion, a separate one of a plurality of axial grooves being defined between each pair of adjacent splines; and
the barrier body further includes two opposing axial ends and a rectangular channel extending from the inner end toward the outer end, the channel being defined by two facing inner side surfaces extending between the two axial ends and a base surface extending between the two inner side surfaces, each inner side surface being disposed against a separate one of the two outer side surfaces of the base connective portion, each one of the inner side surfaces of the channel of the barrier body including a plurality of parallel axial splines extending between the two axial ends of the barrier body and a plurality of axial grooves each being defined between each pair of adjacent splines of the barrier body;
wherein at least one spline of each outer side surface of the base connective portion is disposed within one groove of one of the two inner side surfaces of the barrier channel and at least one spline of each inner side surface of the barrier channel is disposed within one groove of one of the two outer side surfaces of the base connective portion.

12. The guard as recited in claim 11, wherein a radial distance between the barrier outer end and the central axis is adjustable by varying the number of axial splines of the base connective portion disposed within the grooves of the barrier body channel and the number of axial splines of the barrier body channel disposed within the grooves of the base connective portion.

13. The guard as recited in claim 1, wherein the barrier includes a body with a channel and the base includes a connective portion disposed within the channel of the barrier body so as to removably connect the base and the barrier.

14. The guard as recited in claim 13, wherein:
the base connective portion is generally rectangular and has first and second axial ends and two opposing outer side surfaces extending between the first and second axial ends, each one of the outer side surfaces of the base connective portion including a plurality of parallel axial splines extending between the first and second axial ends, a separate one of a plurality of axial grooves being defined between each pair of adjacent splines; and
the barrier includes a body having an inner end, an outer end, two opposing axial ends and a rectangular channel extending from the inner end toward the outer end, the channel being generally rectangular and defined by two facing inner side surfaces extending between the two axial ends and a base surface extending between the two inner side surfaces, each inner side surface being disposed against a separate one of the two outer side surfaces of the base connective portion, each one of the inner side surfaces of the channel of the barrier body including a plurality of parallel axial splines extending between the first and second axial ends of the barrier body and a plurality of axial grooves each being defined between each pair of adjacent splines of the barrier body;

wherein at least one spline of each outer side surface of the base connective portion is disposed within one groove of one of the two inner side surfaces of the barrier channel and at least one spline of each inner side surface of the barrier body is disposed within one groove of one of the two outer side surfaces of the base connective portion.

15. The guard as recited in claim 1, wherein the barrier includes a frustoconical body having a radially-larger first axial end disposable against the mounting surface, a radially-smaller second axial end spaced from the mounting surface along the central axis, and a central bore extending between the first and second axial ends, the base being disposed within the central bore of the barrier body.

16. The guard as recited in claim 15, wherein the barrier body has a frustoconical side wall with a circular edge at the first axial end defining an opening, a circular end wall at the second axial end, and a central, enclosed tubular wall extending axially inwardly from the circular end wall toward the first end of the body and providing the central bore of the barrier body.

17. The guard as recited in claim 16, wherein:
the base includes a partially annular clamp portion configured to be disposed about the sensor and a generally rectangular connective portion, the bore extending through both the clamp portion and the connective portion; and
the tubular wall of the barrier body includes a partially annular portion disposed about the base clamp portion and a rectangular portion disposed about the base connective portion.

18. A guard for a sensor, the sensor having an elongated body with a centerline and opposing ends spaced apart along the centerline, one end of the sensor body being mountable on a mounting surface of a machine such that the centerline is perpendicular to the mounting surface, the guard comprising:
a base having a bore with a central axis and configured to receive at least a portion of the sensor body such that the base is disposed at least partially about the sensor and the central axis is collinear with the centerline, the base including a partially annular clamp portion configured to be disposed about the sensor and a generally rectangular connective portion integral with the clamp portion, the bore extending through both the clamp portion and the connective portion; and
a barrier coupled with the base and including a body formed as a generally trapezoidal prism, the barrier body having an inner end, an outer end spaced radially from the inner end by a radial width and a rectangular channel extending inwardly from the inner end and toward the outer end, the base rectangular connective portion being disposed within the barrier rectangular channel to connect the barrier with the base, the radial width of the barrier body having a value of at least half of a perpendicular distance between the centerline of the sensor and another surface of the machine or of another object that is disposed within a plane extending perpendicular to or intersecting with a plane containing the mounting surface.

19. A guard for a sensor, the sensor having an elongated body with a centerline and opposing ends spaced apart along the centerline, one end of the sensor body being mountable on a mounting surface of a machine such that the centerline is perpendicular to the mounting surface, the guard comprising:
a base having a bore with a central axis, the bore being configured to receive at least a portion of the sensor body such that the base is disposed at least partially about the sensor and the central axis is collinear with the centerline; and
a barrier including a frustoconical body having a radially-larger first axial end disposable against the mounting surface, a radially-smaller second axial end spaced from the mounting surface along the central axis, and a central bore extending between the first and second axial ends, the base being disposed within the central bore of the barrier body to couple the barrier with the base.

20. A guard for a sensor, the sensor having an elongated body with a centerline and opposing ends spaced apart along the centerline, one end of the sensor body being mountable on a mounting surface of a machine such that the centerline is perpendicular to the mounting surface, the guard comprising:
a base having a bore with a central axis, the bore being configured to receive at least a portion of the sensor body such that the base is disposed at least partially about the sensor and the central axis is collinear with the centerline; and
a barrier coupled with the base and configured to occupy at least an arcuate portion of a cylindrical space about the central axis of the base so as to prevent contact with the sensor body;
wherein the barrier includes a body having a radially inner end connected with the base and a radially outer end spaced radially from the inner end by a radial width, the radial width of the barrier body having a value of at least half of a perpendicular distance between the centerline of the sensor and another surface of the machine or of another object that is disposed within a plane extending perpendicular to or intersecting with a plane containing the mounting surface.

21. A guard for a sensor, the sensor having an elongated body with a centerline and opposing ends spaced apart along the centerline, one end of the sensor body being mountable on a mounting surface of a machine such that the centerline is perpendicular to the mounting surface, the guard comprising:
a base having a bore with a central axis, the bore being configured to receive at least a portion of the sensor body such that the base is disposed at least partially about the sensor and the central axis is collinear with the centerline; and
a barrier coupled with the base and configured to occupy at least an arcuate portion of a cylindrical space about the central axis of the base so as to prevent contact with the sensor body;
wherein the barrier body is adjustably coupled with the base so as to vary a width of a radial gap between an outer end of the barrier body and another machine surface.

* * * * *